(12) United States Patent
Lin et al.

(10) Patent No.: US 7,205,838 B2
(45) Date of Patent: Apr. 17, 2007

(54) CIRCUIT STRUCTURE CAPABLE OF ADJUSTING GRADIENT OF OUTPUT TO TEMPERATURE VARIATION

(75) Inventors: Ho-Wen Lin, Taipei Hsien (TW); Lin Abel Chu, Taipei Hsien (TW)

(73) Assignee: Asia Vital Components Co., Ltd., Kaohsiung (TW)

( * ) Notice: Subject to any disclaimer, the term of this patent is extended or adjusted under 35 U.S.C. 154(b) by 29 days.

(21) Appl. No.: 10/857,977

(22) Filed: Jun. 2, 2004

(65) Prior Publication Data

US 2005/0212598 A1 Sep. 29, 2005

(30) Foreign Application Priority Data

Mar. 29, 2004 (TW) ............................... 93108565 A

(51) Int. Cl.
 *H03F 3/45* (2006.01)
(52) U.S. Cl. ...................... 330/256; 330/289
(58) Field of Classification Search ........... 330/256, 330/289
 See application file for complete search history.

(56) References Cited

U.S. PATENT DOCUMENTS

| 4,326,171 | A | * | 4/1982 | Shaw et al. ............ 330/256 |
| 4,849,710 | A | * | 7/1989 | Vo ........................ 330/277 |
| 5,197,858 | A | * | 3/1993 | Cheng .................... 417/14 |
| 5,656,189 | A | * | 8/1997 | Crockett et al. ........ 219/499 |
| 6,359,498 | B1 | * | 3/2002 | Kurihara et al. ......... 327/513 |
| 6,396,231 | B1 | * | 5/2002 | Horng et al. ........... 318/471 |
| 6,407,525 | B1 | * | 6/2002 | Horng et al. ........... 318/473 |

FOREIGN PATENT DOCUMENTS

JP           01180106 A  *  7/1989

* cited by examiner

*Primary Examiner*—Alan Wong
(74) *Attorney, Agent, or Firm*—Birch, Stewart, Kolasch & Birch, LLP

(57) ABSTRACT

A circuit structure capable of adjusting gradient of output to temperature variation includes at least a sensing unit for detecting ambient temperature variation and generating a sensing signal, an amplifying unit connected to the sensing unit for increasing a level of the sensing signal, and an adjusting unit connected to the amplifying unit for increasing or decreasing an amplification ratio of the amplifying unit, so as to change a gradient of an output of the amplifying unit to temperature variation.

8 Claims, 5 Drawing Sheets

| TEMPERATURE | VIN | R1 | R3 | R2 | R4 | R5 | R6 | Va | Vb | Vo | Curve |
|---|---|---|---|---|---|---|---|---|---|---|---|
| 25 | 12V | 20K | 10K | | | | | 4 | | 4 | A |
| 35 | 12V | 20K | 6.95K | | | | | 3.1 | | 3.1 | |
| 25 | 12V | 20K | 10K | 200K | 6.95K | 500K | 200K | 4 | 3.1 | 4.18 | C |
| 35 | 12V | 20K | 6.95K | 200K | 6.95K | 500K | 200K | 3.1 | 3.1 | 3.1 | |
| 25 | 12V | 20K | 10K | 200K | 6.95K | 200K | 200K | 4 | 3.1 | 4.9 | D |
| 35 | 12V | 20K | 6.95K | 200K | 6.95K | 200K | 200K | 3.1 | 3.1 | 3.1 | |
| 25 | 12V | 20K | 10K | 200K | 6.95K | 100K | 200K | 4 | 3.1 | 5.8 | E |
| 35 | 12V | 20K | 6.95K | 200K | 6.95K | 100K | 200K | 3.1 | 3.1 | 3.1 | |

CIRCUIT STRUCTURE CAPABLE OF ADJUSTING GRADIENT OF OUTPUT TO TEMPERATURE VARIATION

This Non-provisional application claims priority under 35 U.S.C. § 119(a) on Patent Application No(s). 93108565 filed in Taiwan on Mar. 29, 2004, the entire contents of which are hereby incorporated by reference.

FIELD OF THE INVENTION

The present invention relates to a circuit structure capable of adjusting gradient of output to temperature variation, and more particularly to a circuit structure that includes a sensing unit and an amplifying unit that work together to increase a signal level of a detected temperature variation, and an adjusting unit for changing a gradient of output of the amplifying unit to temperature variation.

BACKGROUND OF THE INVENTION

An apparatus consumes energy during operation and produces heat. To maintain the apparatus in a stable working state, it is necessary to keep its temperature within a desired range. Therefore, there is a need to detect ambient temperature variation surrounding the apparatus and timely control the temperature of the apparatus. FIG. 1 is a first conventional temperature control circuit for a general cooling fan, and mainly includes a resistor 111 serially connected to a thermal resistor 112. When a constant voltage Vcc is applied across the circuit, the thermal resistor 112 varies its resistance with variation of temperature, and a voltage Vo at an output of the circuit varies with changes in the resistance of the thermal resistor 112. Wherein, the voltage Vo at the output varies at a fixed gradient.

FIG. 2 is a second conventional temperature control circuit for a general cooling fan, and mainly includes two parallelly connected thermal resistors 112' and a resistor 111 serially connected to the two thermal resistor 112', so that a voltage Vo at an output of the parallelly connected thermal resistors 112' and the resistor 111 after a voltage division varies with the resistance of the parallelly connected thermal resistors 112'. However, the resistance of the parallelly connected thermal resistors 112' at room temperature is generally the same as that of the circuit with one single thermal resistor 112 as shown in FIG. 1.

FIG. 3 is a third conventional temperature control circuit for a general cooling fan, and mainly includes two serially connected thermal resistors 112' and a resistor 111 serially connected to the two thermal resistor 112', so that a voltage Vo at an output of the serially connected thermal resistors 112' and the resistor 111 after a voltage division varies with the resistance of the serially connected thermal resistors 112'. However, the resistance of the serially connected thermal resistors 112' at room temperature is generally the same as that of the circuit with one single thermal resistor 112 as shown in FIG. 1.

Please refer to FIG. 4 along with FIGS. 1, 2, and 3. When the temperature changes from T1 to T2, both the changes of the voltage Vo at the output of several parallelly or serially connected thermal resistors 112' and one serially connected resistor 111 obtained from voltage division, as shown by the oblique lines b and c in FIG. 4, and the changes of the voltage Vo at the output of serially connected one thermal resistor 112 and one resistor 111, as shown by the oblique line a in FIG. 4, have a fixed gradient. That is, the conventional temperature control circuits do not change the gradient of output to temperature variation to enable changes of sensitivity of the circuit to the temperature variation. For example, in actual applications, a fan driven by the output voltage Vo of any of the above-described temperature control circuits does not automatically switch to different rotary speeds within a fixed range of temperature variation, and therefore could not satisfy a user's need. It is therefore desirable to develop a circuit structure to eliminate the drawbacks existed in the conventional temperature control circuits.

SUMMARY OF THE INVENTION

A primary object of the present invention is to provide a circuit structure capable of adjusting gradient of output to temperature variation, so that a detected temperature signal level may be easily changed to different amplification ratio to change or adjust the rate of change of output to temperature variation.

Another object of the present invention is to provide a circuit structure that enables an increased sensitivity of output to temperature variation by way of amplifying a detected temperature signal level.

A further object of the present invention is to provide a circuit structure that enables adjustment of gradient of output to temperature variation and increased sensitivity of output to temperature variation, and can therefore satisfy the need in different applications, and timely respond to changes in temperature to allow increased safety in use of an apparatus employing the circuit structure of the present invention.

To achieve the above and other objects, the circuit structure capable of adjusting gradient of output to temperature variation according to the present invention includes at least a sensing unit for detecting ambient temperature variation and generating a sensing signal, an amplifying unit connected to the sensing unit for increasing a level of the sensing signal and accordingly enabling an increased sensitivity in detecting temperature variation, and an adjusting unit connected to the amplifying unit for increasing or decreasing an amplification ratio of the amplifying unit, so as to change a gradient or rate of change of an output of the amplifying unit to temperature variation. With the above arrangements, the circuit structure of the present invention is able to satisfy the need in different applications, particularly in systems or apparatus, such as a computer system, a radiating means for a power supply device, and an air conditioning system, that must be maintained at a stable working temperature.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIG. 10 is a reference test table from FIG. 8.

DETAILED DESCRIPTION OF THE PREFERRED EMBODIMENTS

Figure 1:
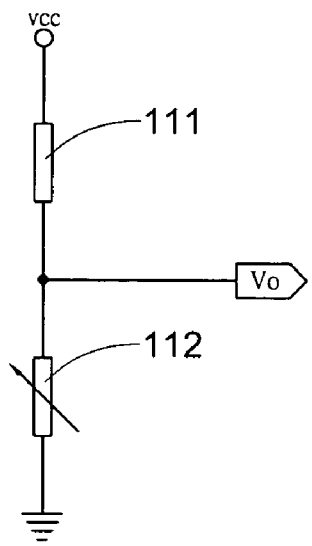
FIG. 1 is a first conventional temperature control circuit for cooling fan.
Figure 2:
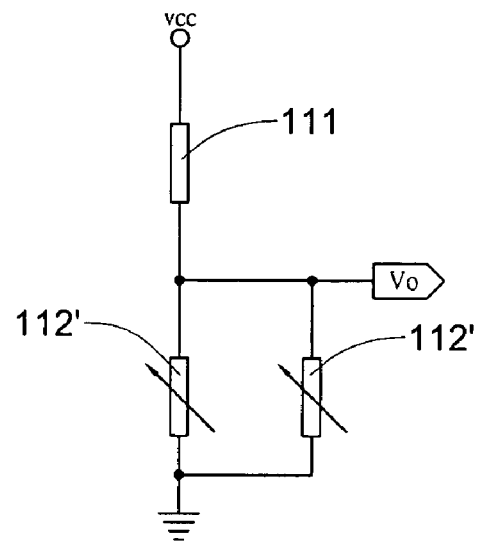
FIG. 2 is a second conventional temperature control circuit for cooling fan.
Figure 3:
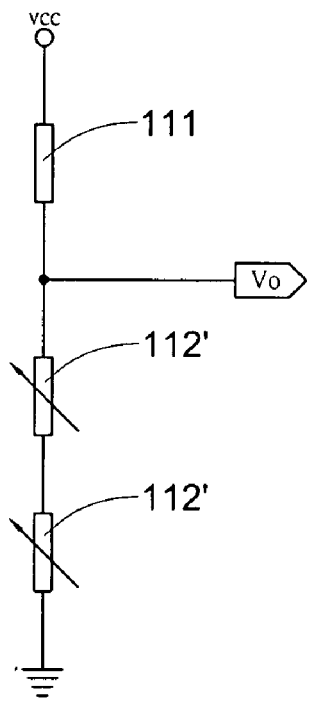
FIG. 3 is a third conventional temperature control circuit for cooling fan.
Figure 4:
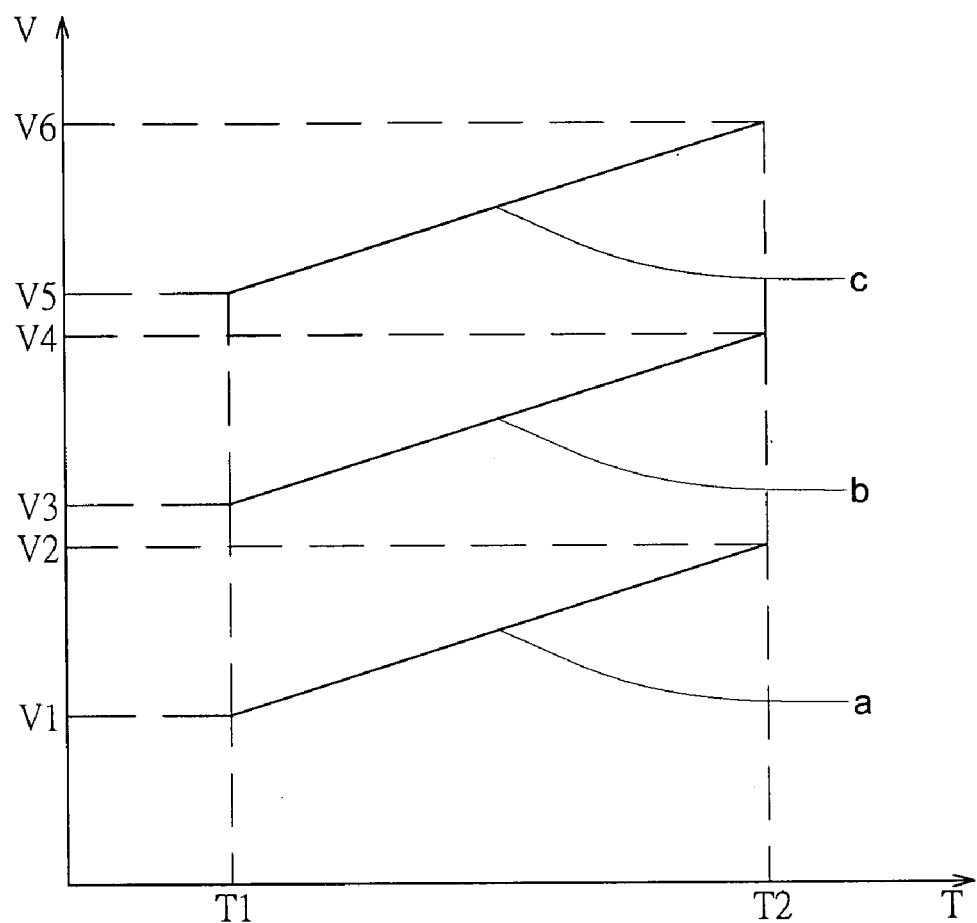
FIG. 4 is a graph showing curves of temperature variation to voltage output for the first, second, and third conventional temperature control circuits shown in FIGS. 1, 2, and 3, respectively.
Figure 5:
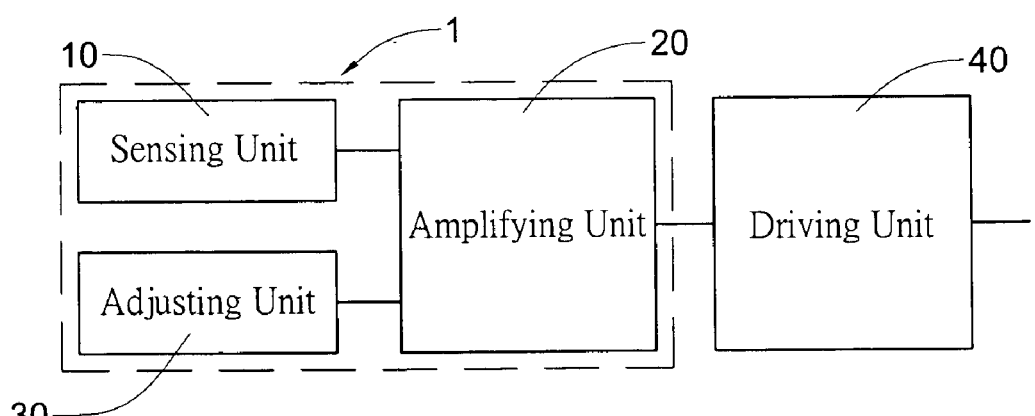
FIG. 5 is a block diagram for a preferred embodiment of the present invention.

Please refer to FIG. 5 that is a block diagram showing a circuit structure 1 according to the present invention capable of adjusting a gradient of output to temperature variation. As shown, the circuit structure 1 includes at least a sensing unit 10 for detecting ambient temperature variation and generating a sensing signal, an amplifying unit 20 connected to the sensing unit 10 for increasing a level of the sensing signal generated by the sensing unit 10, and an adjusting unit 30 connected to the amplifying unit 20 for increasing or decreasing an amplification ratio of the amplifying unit 20. In a feasible embodiment of the present invention, the sensing unit 10 is formed by connecting at least one thermal resistor 11 (R3 in FIGS. 6 and 7) to at least one resistor 12 (R1 in FIGS. 6 and 7) as will be described in more details later, so as to form a voltage division and generate a voltage division signal Va. In a feasible embodiment of the present invention, the amplifying unit 20 is an operational amplifier, and the aforesaid voltage division signal Va generated by the sensing unit 10 is sent to a positive input of the amplifying unit 20.

Figure 6:
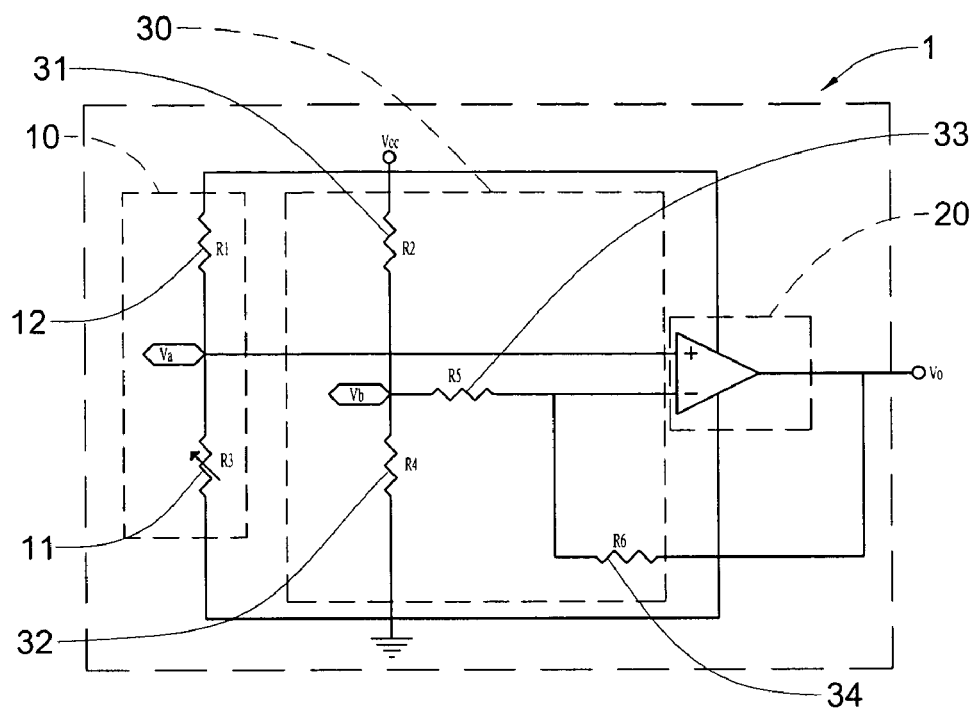
FIG. 6 is a circuit diagram for a first preferred embodiment of the present invention shown in FIG. 5.
Figure 7:
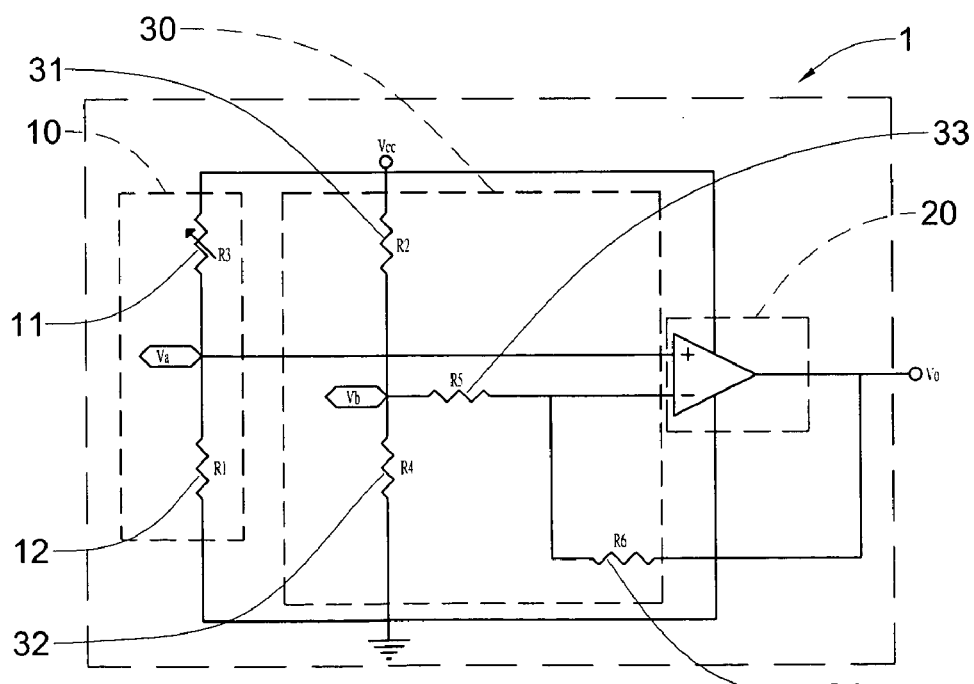
FIG. 7 is a circuit diagram for a second preferred embodiment of the present invention shown in FIG. 5.

Please refer to FIGS. 6 and 7. In a feasible embodiment of the present invention, the adjusting unit 30 includes a first resistor 31 (R2) connected to a second resistor 32 (R4) to form a voltage division, and generates a voltage division signal Vb, which is sent to a negative input of the amplifying unit 20 via a third resistor. 33 (R5) connected to the first and the second resistor 31, 32, and is fed back from an output of the amplifying unit 20 to the negative input of the amplifying unit 20 and connected to the third resistor 33 via a fourth resistor 34 (R6). Therefore, the amplifying unit 20 may be adjusted to a different amplification ratio by way of changing the aforesaid third and fourth resistors 33, 34. That is, in the present invention, while the amplifying unit 20 is used to increase the level of the sensing signal of the sensing unit 10, the adjusting unit 30 is further used to control the amplification ratio of the amplifying unit 20, in order to change a gradient of the output of the amplifying unit 20 to temperature variation, and thereby changes a sensitivity of the circuit structure of the present invention to temperature variation to meet actual need in different applications. The output of the amplifying unit 20 varied with temperature variation satisfies the following relation expression:

$$Vo(t)=Va(1+R6/R5)-Vb(R6/R5)$$

Figure 8:
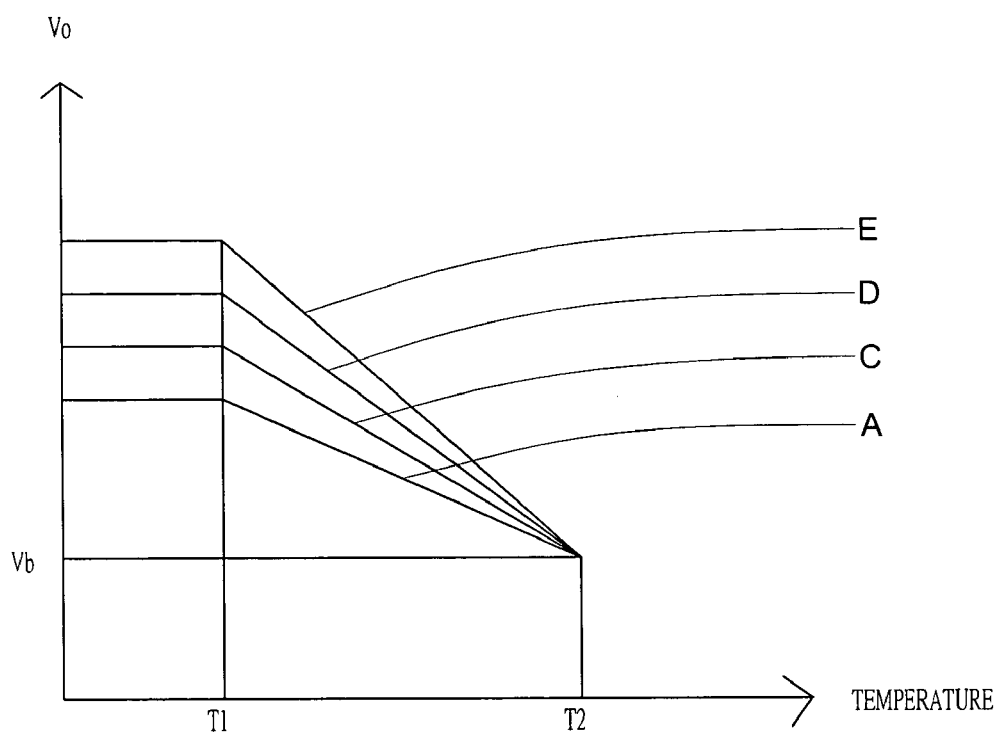
FIG. 8 is a decreasing curve of output to temperature variation according to the present invention.
Figure 9:
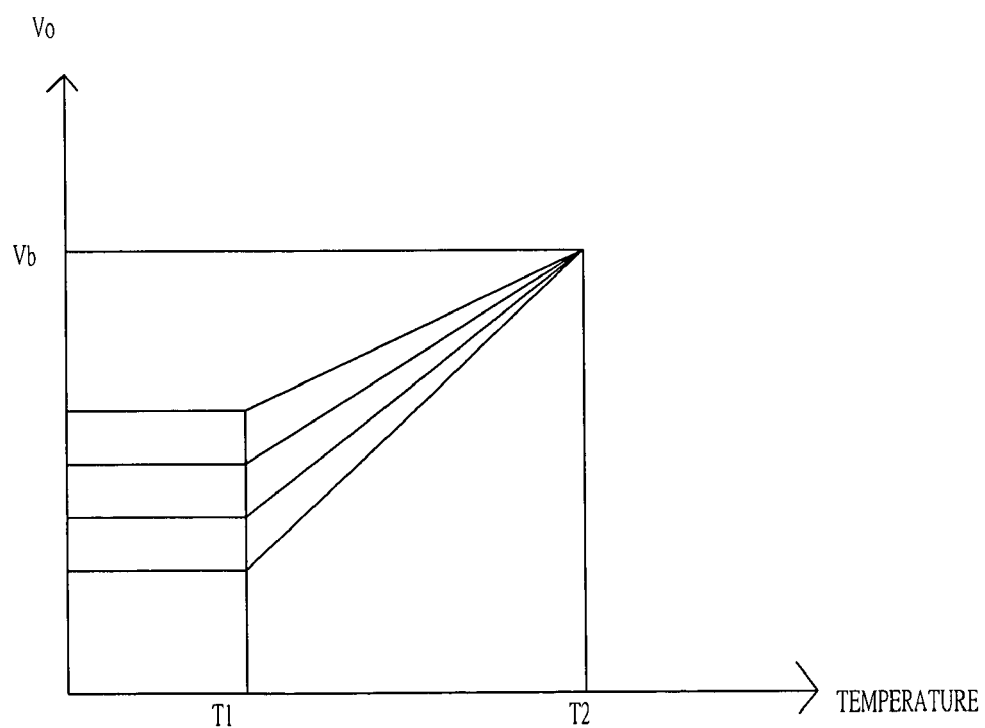
FIG. 9 is an increasing curve of output to temperature variation according to the present invention.

FIGS. 8 and 9 are decreasing and increasing curves, respectively, of output to temperature variation according to the present invention. For the circuit structure 1 of the present invention to have change rates of output to temperature variation as the gradients of curves A, C, D, and E shown in FIG. 8, the thermal resistor 11 in the aforesaid sensing unit 10 may be either a thermal resistor having a negative temperature coefficient and be implemented as FIG. 6, or a thermal resistor having a positive temperature coefficient and be implemented as FIG. 7. And, when it is desired to have change rates of output to temperature variation as the gradients of curves shown in FIG. 9, the aforesaid thermal resistor 11 may be either a thermal resistor having a negative temperature coefficient and be implemented as FIG. 7, or a thermal resistor having a positive temperature coefficient and be implemented as FIG. 6. FIG. 10 is a reference test table corresponding to curves shown in FIG. 8. However, it is to be understood values listed in the reference test table of FIG. 10 are merely illustrative of the application of the present invention and not intended to limit the scope of the present invention.

As can be seen from FIG. 5, the amplifying unit 20 of the present invention is further connected to a driving unit 40, which drives a fan, an air conditioning unit, or an electric heater (not shown) connected thereto, so that the present invention may timely respond to temperature variation to enable enhanced safety and convenience in use of the fan, the air conditioning unit, or the electric heater. The response curves of output to temperature shown in FIGS. 8 and 9 may be employed depending on the characteristics of the driving unit 40. For example, the curves of FIG. 8 may be applied to a case in which the driving unit 40 has an increasing output and the fan (not shown) driven by the driving unit 40 has an increasing rotary speed when the amplifying unit 20 has a decreasing output. And, the curves of FIG. 9 may be applied to a case in which the driving unit 40 has an increasing output and the fan (not shown) driven by the driving unit 40 has an increasing rotary speed when the amplifying unit 20 has an increasing output.

The present invention has been described with some preferred embodiments thereof and it is understood that many changes and modifications in the described embodiments can be carried out without departing from the scope and the spirit of the invention. For example, it is possible to integrate the aforesaid sensing unit 10, the amplifying unit 20, the adjusting unit 30, and the driving unit 40 into one single chip, or it is possible for the aforesaid amplifying unit 20 to be formed from separated elements., such as transistors, field effect transistor, etc. Therefore, all changes and modifications in the described embodiments of the present invention, and all equivalent effects produced due to applications of such changes and modifications should all be included in the present invention that is intended to be limited only by the appended claims.

What is claimed is:

1. A circuit structure capable of adjusting gradient of output to temperature variation, comprising:
   at least one sensing unit for detecting ambient temperature variation and generating a sensing signal,
   an amplifying unit connected to said sensing unit for increasing a level of said sensing signal generated by said sensing unit, and
   an adjusting unit connected to said amplifying unit for increasing or decreasing an amplification ratio of said amplifying unit to change a gradient of output of said amplifying unit to temperature variation;
   said adjusting unit including two resistors serially connected between a voltage source and ground; and
   said adjusting unit further including a third resistor connected between an input to said amplifying unit and a common point between the serially connected resistors.

2. The circuit structure capable of adjusting gradient of output to temperature variation as claimed in claim 1, wherein said sensing unit is formed by connecting at least one thermal resistor to at least one resistor.

3. The circuit structure capable of adjusting gradient of output to temperature variation as claimed in claim 1, wherein said amplifying unit comprises an operational amplifier.

4. The circuit structure capable of adjusting gradient of output to temperature variation as claimed in claim 1, wherein said amplifying unit is connected to a driving unit.

5. The circuit structure capable of adjusting gradient of output to temperature variation as claimed in claim 1, wherein said sensing unit, said amplifying unit, and said adjusting unit are integrated into one single chip.

6. The circuit structure capable of adjusting gradient of output to temperature variation as claimed in claim 4, wherein said sensing unit, said amplifying unit, and said adjusting unit are integrated into one single chip.

7. The circuit structure capable of adjusting gradient of output to temperature variation as claimed in claim 1, wherein said adjusting unit further includes a fourth resistor connected to the output of said amplifying unit and said input of said amplifying unit.

8. The circuit structure capable of adjusting gradient of output to temperature variation as claimed in claim 7, wherein the output of the amplifying unit equals Va (1+R6/R5)−Vb (R6/R5), where Va is the output of the sensing unit, Vb is the voltage at the common point between the two serially connected resistors, R5 is the resistance of the third resistor and R6 is the resistance of the fourth resistor.

* * * * *